US008458107B2

(12) United States Patent  (10) Patent No.: US 8,458,107 B2
Cantin et al.  (45) Date of Patent: Jun. 4, 2013

(54) GENERATING CONSTRAINT-COMPLIANT POPULATIONS IN POPULATION-BASED OPTIMIZATION

(75) Inventors: Jason F. Cantin, Round Rock, TX (US); Sameh S. Sharkawi, College Station, TX (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 12/828,132

(22) Filed: Jun. 30, 2010

(65) Prior Publication Data

US 2012/0005137 A1 Jan. 5, 2012

(51) Int. Cl.
G06F 15/18 (2006.01)
(52) U.S. Cl.
USPC .......................................................... 706/13
(58) Field of Classification Search
None
See application file for complete search history.

(56) References Cited

U.S. PATENT DOCUMENTS

| | | | |
|---|---|---|---|
| 5,222,192 A | 6/1993 | Shaefer | |
| 5,245,696 A | 9/1993 | Stork et al. | |
| 6,088,510 A | 7/2000 | Sims | |
| 7,328,194 B2 | 2/2008 | Dimitriou et al. | |
| 7,337,154 B2 | 2/2008 | Manson et al. | |
| 7,606,776 B1 * | 10/2009 | Havens et al. | 706/19 |
| 7,672,910 B1 * | 3/2010 | Kumar | 706/13 |
| 2004/0267679 A1 * | 12/2004 | Fromherz et al. | 706/19 |
| 2005/0222827 A1 * | 10/2005 | Emek et al. | 703/2 |
| 2006/0015829 A1 * | 1/2006 | De Smedt et al. | 716/2 |
| 2006/0047611 A1 * | 3/2006 | Selifonov et al. | 706/13 |
| 2006/0080268 A1 | 4/2006 | Afeyan et al. | |
| 2006/0195204 A1 * | 8/2006 | Bonabeau et al. | 700/83 |
| 2006/0218107 A1 | 9/2006 | Young | |
| 2007/0094161 A1 | 4/2007 | Calabro et al. | |
| 2008/0168015 A1 | 7/2008 | Thie et al. | |
| 2008/0270331 A1 * | 10/2008 | Taylor et al. | 706/13 |
| 2009/0228414 A1 * | 9/2009 | Dumeur et al. | 706/13 |
| 2010/0199257 A1 | 8/2010 | Biggerstaff | |
| 2010/0250319 A1 | 9/2010 | Khosla et al. | |
| 2011/0022557 A1 * | 1/2011 | Bagley et al. | 706/46 |
| 2012/0005136 A1 | 1/2012 | Cantin | |
| 2012/0005138 A1 | 1/2012 | Cantin | |

OTHER PUBLICATIONS

Barnier et al, Optimization by hybridization of a genetic algorithm with constraint satisfaction techniques, 1998.*
Platzner et al, Exploiting Parallelism in Constraint Satisfaction for Qualitative Simulation, Dec. 1995.*

(Continued)

Primary Examiner — Jeffrey A Gaffin
Assistant Examiner — Mikayla Chubb
(74) Attorney, Agent, or Firm — DeLizio Gilliam, PLLC

(57) ABSTRACT

An example system and process where some operations include determining variables of an optimization problem, which include one or more constrained variables ("constrained variables") constrained by one or more constraint conditions for the optimization problem and one or more non-constrained variables ("non-constrained variables"). The operations further include determining values for the constrained variables that comply with the one or more constraint conditions ("constraint compliant values") and generating values for the non-constrained variables ("non-constrained values"). The operations further include, prior to running a computer based simulation that implements a population-based optimization algorithm, randomly combining ones of the constraint compliant values with ones of the non-constrained values into candidate solutions, where each of the candidate solutions includes at least one of the constraint compliant values to satisfy the one or more constraint conditions. The operations further include running the computer based simulation with the candidate solutions input as a population.

25 Claims, 10 Drawing Sheets

OTHER PUBLICATIONS

Epstein et al, Search on Constraint Satisfaction Problems with Sparse Secondary Structure.*

Ermon et al, Uniform Solution Sampling Using a Constraint Solver As an Oracle.*

Ronald, Duplicate Genotypes in a Genetic Algorithm, 1998.*

Balakrishnan, P V. et al., "Development of Hybrid Genetic Algorithms for Product Line Designs", *IEEE Transactions on Systems, Man and Cybernetics* Part B Cybernetics, vol. 34, No. 1, Date Obtained from the Internet: Sep. 4, 2009 Feb. 2004, pp. 468-483.

Brown, Daniel G. , "Optimizing Multiple Seeds for Protein Homology Search", *IEEE Transactions on Computational Biology and Bioformatics* vol. 2, No. 1, Date obtained from the internet: Sep. 4, 2009 Jan.-Mar. 2005, pp. 29-38.

Cinque, Luigi et al., "Improvement in range segmentation parameters tuning", Pattern Recognition, 2002. Proceedings. 16th International Conference, vol. 1, Date obtained from the internet: Sep. 4, 2009 Aug. 15, 2002, pp. 176-179.

Deb, Kalyanmoy , "An Efficient Constraint Handling Method for Genetic Algorithms", *Computer Methods in Applied Mechanics and Engineering* 1998, 35 pages.

Guan, Hong-Bo et al., "The Briefest Reduct of Rough Sets Based on Genetic Algorithm", *Proceedings of 2008 IEEE International Symposium on IT in Medicine and Education* Date obtained from the internet: Sep. 4, 2009 Dec. 2008, pp. 23-27.

Khodabakhshi, A. H. et al., "An efficient data structure for applying multiple seeds in homology search", Bioinformatics and Bioengineering, 2007. BIBE 2007. Proceedings of the 7th IEEE International Conference, Date obtained from the internet: Sep. 4, 2009 Oct. 2007, pp. 1374-1378.

Li, Xiaodong et al., "The effects of varying population density in a fine-grained parallel genetic algorithm", Evolutionary Computation, 2002. CEC '02. Proceedings of the 2002 Congress, vol. 2, Date obtained from the internet: Sep. 4, 2009 May 2002, pp. 1709-1714.

Simionescu, P A. et al., "A Two-Population Evolutionary Algorithm for Constrained Optimization Problems", *IEEE Congress on Evolutionary Computation* 2006, 7 pages.

"U.S. Appl. No. 12/828,118 Office Action", Sep. 24, 2012, 18 pages.

"U.S. Appl. No. 12/828,169 Office Action", Sep. 25, 2012, 13 pages.

Michalewicz, Zbigniew et al., "Genocop III: A Co-evolutionary Algorithm for Numerical Optimization Problems with Nonlinear Constraints", 1995, pp. 1-5.

U.S. Appl. No. 12/828,118, filed Jun. 30, 2010, Cantin, Jason F.

U.S. Appl. No. 12/828,169, filed Jun. 30, 2010, Cantin, Jason F.

* cited by examiner

|                                 |   |   | 930 | 931 | 932 | 933 |   | 525 |
|---------------------------------|---|---|-----|-----|-----|-----|---|-----|
| CANDIDATE SOLUTION              | 1 | 6 | 2   | 5   | 1   | 3   | 7 | 0   |

|                                 |   |   | 940 | 931 | 942 | 933 |   | 926 |
|---------------------------------|---|---|-----|-----|-----|-----|---|-----|
| MUTATED CANDIDATE SOLUTION      | 3 | 5 | 0   | 5   | 0   | 3   | 2 | 6   |

|                                       |   |   | 950 | 931 |   |   |   | 927 |
|---------------------------------------|---|---|-----|-----|---|---|---|-----|
| COMPLIANT MUTATED CANDIDATE SOLUTION  | 3 | 5 | 5   | 5   | 0 | 3 | 2 | 6   |

FIG. 9

GENERATING CONSTRAINT-COMPLIANT POPULATIONS IN POPULATION-BASED OPTIMIZATION

BACKGROUND

Embodiments of the inventive subject matter generally relate to the field of population-based optimization, and, more particularly, to generating or modifying constraint compliant populations in population-based optimization simulations.

Population-based optimization algorithms are used to find solutions to optimization problems by starting with an initial set of random candidate solutions (e.g., provided by a user, randomly generated, etc.) and iteratively analyzing and modifying the candidate solutions, according to an objective function, until reaching a satisfactory solution. Population-based optimization algorithms may also be referred to as metahueristic optimization algorithms, combinatorial optimization algorithms, soft-computing algorithms, etc. For instance, one type of population-based optimization algorithm is an evolutionary algorithm. An evolutionary algorithm uses biological techniques loosely based on biological evolution, reproduction, mutation, recombination, and natural selection to find solutions to optimization problems. Simulations that implement evolutionary algorithms act upon populations, such that individuals in a population represent candidate solutions to an optimization problem. The candidate solutions are evaluated for fitness (i.e., evaluated according to a fitness function) and the population "evolves" as successive generations of the population are selected/generated and modified loosely based on the biological techniques. As the population evolves, overall fitness of the population tends to increase. A solution to the optimization problem is found when the overall fitness of the population has reached a satisfactory level, or in other words, when the fitness function, or other objective function, evaluates to an optimal solution. Simulations based on population-based optimization algorithms, such as evolutionary algorithms, can perform well for finding solutions to problems in engineering, biology, economics, robotics, etc. because objective functions can be tailored to fit the problems.

SUMMARY

Some embodiments include a method directed to determining a plurality of sets of variables of an optimization problem, where a first set of the plurality of sets comprises a constrained variable constrained by a constraint condition indicated by a constraint description for the optimization problem and where a second set of the plurality of sets of variables comprises a non-constrained variable. In some embodiments, the method is further directed to determining a plurality of constraint compliant values for the constrained variable that comply with the constraint condition and generating a plurality of non-constrained values for the non-constrained variable. In some embodiments, the method is further directed to randomly combining individual ones of the plurality of constraint compliant values with individual ones of the plurality of non-constrained values into a plurality of value sets that satisfy the constraint description for the optimization problem. In some embodiments, the method is further directed to running a computer based simulation that implements a population-based optimization algorithm with the plurality of value sets input as a population for the computer-based simulation.

Some embodiments include a computer program product that comprises a computer readable storage medium having computer readable program code. In some embodiments, the computer readable program code is configured to group first variables from an optimization problem into at least one variable set using a mathematical and/or logical description of at least one condition that constrains the first variables within the optimization problem. The first variables, as well as second variables, constitute all variable inputs for the optimization problem. The second variables are not constrained within the optimization problem. The computer readable program code is further configured to generate a data set for the at least one variable set, wherein the data set includes only compliant data value groupings that evaluate properly within the mathematical and/or logical description of the at least one condition. The computer readable program code is further configured to randomly select one of the compliant data values from the data set, and include the one of the compliant data value groupings into a data string, wherein the data string represents a candidate solution to the optimization problem. The computer readable program code is further configured to determine that the data string is unique from additional data strings within the population and insert the data string into the population of the population-based optimization algorithm computer simulation.

Some embodiments include a computer program product that comprises a computer readable storage medium having computer readable program code. In embodiments, the computer readable program code is configured to determine a plurality of sets of variables of an optimization problem, where a first set of the plurality of sets comprises a constrained variable constrained by a constraint condition indicated by a constraint description for the optimization problem and where a second set of the plurality of sets of variables comprises a non-constrained variable. In some embodiments, the computer readable program code is further configured to determine a plurality of constraint compliant values for the constrained variable that comply with the constraint condition and generate a plurality of non-constrained values for the non-constrained variable. In some embodiments, the computer readable program code is further configured to randomly combine individual ones of the plurality of constraint compliant values with individual ones of the plurality of non-constrained values into a plurality of value sets that satisfy the constraint description for the optimization problem. In some embodiments, the computer readable program code is further configured to run a computer based simulation that implements a population-based optimization algorithm with the plurality of value sets input as a population for the computer-based simulation.

Some embodiments include an apparatus comprising a processing unit, a network interface, and a constraint-compliant population module. In some embodiments, the constraint-compliant population module is operable to organize constrained variables for an optimization problem into groups, where each of the groups includes a subset of the constrained variables. Each of the groups includes at least one constraint expression that relates, and mutually constrains, the subset of the constrained variables within the optimization problem during an evolutionary algorithm based computer simulation. The constraint-compliant population module is further operable to determine, separately for each of the groups, data values for each of the subset of constrained variables contained in the each of the groups, where the data values satisfy all variable constraints of the at least one constraint expression for each of the groups. The constraint-compliant population module is further operable to randomly select one of the data values for each of the subset of constrained variables. The constraint-compliant population module is further operable to include in a data string the one of the data values from the each of the subsets of constrained variables, where the data string represents a candidate solution for the optimization problem. The constraint-compliant population module is further operable to randomly generate one or more additional data values for non-constrained variables, where the constrained variables and the non-constrained variables constitute all variable inputs for the optimization problem, and where the non-constrained variables are not constrained by the optimization problem. The constraint-compliant population module is further operable to include the one or more additional data values in the data string, and include the data string in a population of an initial generation for an evolutionary algorithm based simulation.

BRIEF DESCRIPTION OF THE DRAWINGS

The present embodiments may be better understood, and numerous objects, features, and advantages made apparent to those skilled in the art by referencing the accompanying drawings.

FIG. 9 is an example conceptual diagram of performing constraint compliant mutations during a population-based optimization algorithm simulation

DESCRIPTION OF EMBODIMENT(S)

Figure 1:
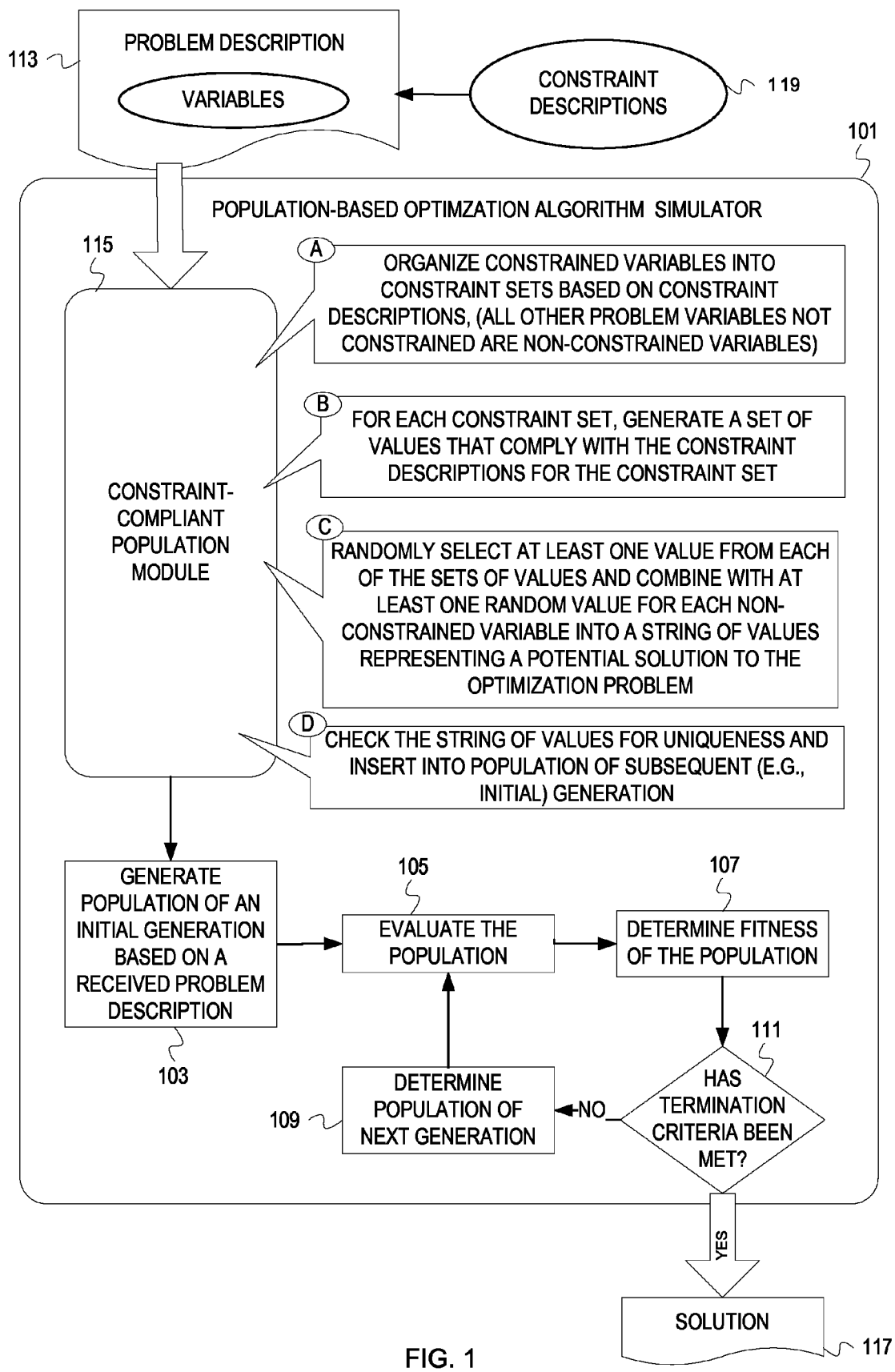
FIG. 1 is an example conceptual diagram of generating a population of an initial generation of constraint compliant candidate solutions during a population-based optimization algorithm simulation.

The description that follows includes exemplary systems, methods, techniques, instruction sequences, and computer program products that embody techniques of the present inventive subject matter. However, it is understood that the described embodiments may be practiced without these specific details. For instance, although examples refer to population-based optimization algorithm simulations, embodiments can utilize specific types of evolutionary algorithms (e.g., genetic algorithms, genetic programming, evolutionary programming, evolution strategy, etc.) suited to fit a particular type of optimization problem being solved. In other instances, examples may utilize swarm intelligence algorithms (e.g., ant colony optimization, particle swarm optimization, stochastic diffusion search, gravitational search algorithms, intelligent water drops algorithms, etc.), differential evolution algorithms, artificial life algorithms, cultural algorithms, harmony search algorithms, artificial immune system algorithms (e.g., clonal selection algorithms, negative selection algorithms, immune network algorithms, dendritic cell algorithms, learning classifier system algorithms, learnable evolution model algorithms, etc), population-based incremental learning algorithms, etc. In other instances, well-known instruction instances, protocols, structures, and techniques have not been shown in detail in order not to obfuscate the description.

The candidate solutions to an optimization problem comprise a set of potential parameters that can be applied to variables in the optimization problem. For example, an electronic design may be optimized. Variables in the electronic design can include transmission line length, transmission line spacing, driver strengths, etc. The candidate solutions represent a set of potential parameters that can be applied to the line length, transmission line spacing, and driver strength variables in the electronic design. Usually, an initial population (i.e., initial generation or generation "0") of candidate solutions is randomly chosen based on a domain of the optimization problem. The randomly generated initial population tends to be unfit, so it can take many generations for the population to reach a satisfactory level of fitness. Some optimization problems are constrained. In other words, an optimization problem may include limiting conditions that restrict or constrain certain values for some variables of the optimization problem. In other words, a solution to the optimization problem must satisfy the limiting conditions. Because the limiting conditions, or constraints, constrain some of the variables ("constrained variables"), and because the constrained variables are part of all potential candidate solutions of the problem, then the constraints also limit or restrict the potential candidate solutions. One example method of generating potential solutions for constrained problems involves using random trial and error when generating potential candidate solutions for the initial population. This random trial-and-error method includes generating a random value for each variable of a problem and combining all of the random values into a potential candidate solution. The random trial-and-error method then tests all of the randomly generated values in the potential candidate solution against the constraints to determine whether the potential candidate solution meets all of the constraints. If the potential candidate solution meets all the constraints, then the random trial-and-error method keeps the potential candidate solution and inserts it into an initial population of candidate solutions. Otherwise, the random trial-and-error method discards the potential candidate solution and continues. However, this random trial-and-error method only works for small, relatively unconstrained problems. For complex problems, random trial-and-error can fail to produce even a single valid candidate solution in a reasonable amount of time.

A tool or application can organize variables of an optimization problem into separate groups or sets of constrained variables and non-constrained variables (i.e., variables that are not subject to a constraint). The tool can then determine constraint compliant values for each of the constrained variables. There can be one or more groups of constrained variables, as well as one or more groups of non-constrained variables, based on the organizing. Determining constraint compliant values on a group basis allows for efficient determination and generation of constraint compliant values for the constrained variables. For each separate group of constrained variables, there are fewer possibilities to explore and fewer constraints to check against, thus allowing efficient exploration of solution space. Efficiently exploring solution space can reduce resources consumed, including time, to generate random populations for constrained optimization problems. Reduced time to generate random populations improves the chances of filling a population of an initial generation (an "initial population"), or any other generation, within predefined time limits, and increases the complexity of problems that population-based optimization algorithms can handle.

To organize the constrained variables into groups, the tool identifies groups of constrained variables from constraint descriptions (e.g., expressions, functions, code-blocks, etc.) that constrain them. The tool determines values for the constrained variables that comply with the constraint descriptions, and randomly selects values for the non-constrained variables. The tool can remove the non-constrained variables from consideration until later, further reducing the solution space to explore. The tool randomly combines the constraint compliant values of the constrained variables groups with the values of the non-constrained variable groups into solution strings that represent candidate solutions. The tool can focus on and find compliant candidate solutions that satisfy all constraints of an optimization problem to improve diversity of randomly generated candidate solutions for constrained problems.

FIG. 1 is an example conceptual diagram of generating a population of an initial generation of constraint compliant candidate solutions during a simulation that implements a population-based optimization algorithm. In FIG. 1, a population-based optimization algorithm simulator 101 may receive an optimization problem description ("problem description") 113. The problem description 113 can define the optimization problem. Examples of optimization problems include circuit design, adder design, compiler tuning, etc. The problem description 113 can indicate variables of the optimization problem, a domain for the candidate solutions, constraints, a fitness evaluation function, seed candidate solutions, criteria for inserting the seed candidate solutions, termination criteria, etc. In some embodiments, the problem description 113 may be included in a specification file. Other embodiments, however, may not utilize a specification file, but instead may ascertain the problem description 113 by accessing hard coded instructions, linked information, data input from a user via a graphical user interface, etc.

The population-based optimization algorithm simulator 101 generates an initial population (103) (i.e., a population of an initial generation) based on the received problem description. The population comprises a plurality of candidate solutions to the optimization problem, however each of the candidate solutions comply with all constraints of the optimization problem. In some embodiments, each of the candidate solutions can be represented by a dataset organized based on the variables of the optimization problem. Each dataset can store one value/parameter for each of the variables, such that an optimization problem with N variables can have datasets comprising N parameters. The population-based optimization algorithm simulator 101 determines a number of candidate solutions to generate based on the problem description 113. For example, the problem description 113 indicates that the population should comprise one hundred candidate solutions. The population-based optimization algorithm simulator 101 can include a constraint-compliant population module 115 that can generate parameters for the candidate solutions based on the domain indicated in the problem description 113 and constraint descriptions 119. The constraint-compliant population module 115 performs operations for stages "A" through "D," generating the initial population (103) of candidate solutions. For example, the optimization problem can comprise three variables: var_1, var_2, and var_3. The constraint-compliant population module 115 analyzes the problem description 113 and determines that the three variables var_1, var_2, and var_3 are constrained by constraint descriptions. The constraint descriptions may include conditions that affect some of the three variables, but not others of the three variables. For example, one constraint description may relate var_1 and var_2 by an inequality statement such as var_1+var_2<10. The constraint-compliant population module 115, therefore, at stage "A" organizes var_1 and var_2 into one group, or constraint set, which identifies var_1 and var_2 as constrained variables. Any other variable that is not found in a constraint description, such as var_3 is a non-constrained variable. Then, the constraint-compliant population module 115 at stage "B," for each constraint set generated at stage "A," generates a set of values that comply with the constraint descriptions. Then, at stage "C," the constraint-compliant population module 115 randomly selects at least one value from each of the set of values generated at stage "B." The constraint-compliant population module 115 also combines the at least one value from each of the set of values with at least one random value for each non-constrained variable into a string of values. The string of values represents a fully compliant candidate solution to the optimization problem because all values that represent constrained variables in the candidate solution are paired with the at least one value from each of the set of values for each constraint set. Thus, the population-based optimization algorithm simulator 101 can ensure that the candidate solution complies with all constraints of the optimization problem. Some embodiments may store and use candidate solutions as arrays instead of, or in addition to, strings of values. Some embodiments may store and use candidate solutions as lists of numbers which are indexes into an instruction table, nodes in a linked list, hashes, objects, or other data structures.

After generating the initial population 103, the population-based optimization algorithm simulator 101 begins a population-based optimization algorithm simulation. For example, the population-based optimization algorithm simulator 101 can evaluate the population (105). The population-based optimization algorithm simulator 101 can evaluate each candidate solution based on applying the parameters indicated in the candidate solutions to variables in the optimization problem and running a simulation of the candidate solution. For example, the problem description 113 can define an electronic design. The population-based optimization algorithm simulator 101 can generate simulation decks for each candidate solution based on applying the parameters indicated by each candidate solution to variables of the electronic design. The population-based optimization algorithm simulator 101 can run a simulation of each simulation deck using a Simulation Program with Integrated Circuit Emphasis (SPICE) simulation tool and collect results of each simulation. As another example, the problem description 113 indicates a computer program to be optimized. The population-based optimization algorithm simulator 101 can run the computer program for each of the candidate solutions by applying the parameters of the candidate solutions to variables of the computer program. The population-based optimization algorithm simulator 101 can collect results of each run of the computer program. The techniques (e.g., SPICE simulations, running computer programs, etc.) for evaluating the population can be defined as part of the fitness evaluation function indicated in the problem description 113.

The population-based optimization algorithm simulator 101 can further determine fitness of the population (107). The fitness can be represented by a numerical value within a range specified in the problem description 113. For example, the fitness can be represented by a percentage. Determining fitness of the population 107 can comprise determining individual fitness metrics of each candidate solution. The population-based optimization algorithm simulator 101 can determine each candidate solution's individual fitness metric based on the fitness evaluation function indicated in the problem description 113. For example, the population-based optimization algorithm simulator 101 can analyze the simulation results of each candidate solution based on indicated heuristics. The population-based optimization algorithm simulator 101 can determine the fitness of the population based on aggregating the individual fitness metrics. For example, the population-based optimization algorithm simulator 101 can average the individual fitness metrics. As another example, the population-based optimization algorithm simulator 101 can take the median of the individual fitness metrics. In some embodiments, the population-based optimization algorithm simulator 101 can also utilize the constraint-compliant population module 115 to evaluate a population (105), determine fitness of the population (107) and determine a population of a next generation (109).

The population-based optimization algorithm simulator 101 can further determine if termination criteria has been met (111). The problem description 113 can indicate termination criteria. For example, the population-based optimization algorithm simulation may terminate when fitness of the population reaches an indicated satisfactory level. As another example, the population-based optimization algorithm simulation may terminate when fitness of the population reaches a plateau. As another example, the population-based optimization algorithm simulation may terminate when a specified number of generations has been reached. The population-based optimization algorithm simulator 101 can output a solution 117 when termination criteria are met. The solution 117 can comprise indications of each of the candidate solutions that constitute the population at termination, individual fitness metrics of each of the candidate solutions, simulation/test results, etc.

If the termination criteria have not been met, the population-based optimization algorithm simulator 101 can determine (e.g., generate) a next generation of the population (109). For example, the current generation is generation "0," so the population-based optimization algorithm simulator 101 determines a generation "1." The population-based optimization algorithm simulator 101 can determine the next generation in accordance with a combination of biological techniques loosely based on evolution, reproduction, mutation, recombination, and natural selection. For example, the population-based optimization algorithm simulator 101 can select a certain number of the candidate solutions of generation "0" to remain unchanged in generation "1" based on survival of the fittest techniques. The unchanged individuals can represent a portion of the population of generation "1." As another example, the population-based optimization algorithm simulator 101 can select candidate solutions from generation "0" as parents to reproduce offspring candidate solutions for a portion of the population of generation "1." As another example, another portion of the population can be generated based on mutating candidate solutions of generation "0." In addition, a seeding unit 115 can insert candidate solutions into the next generation when the seeding unit 115 detects a condition for inserting the candidate solutions. After the next generation of the population is determined, the population-based optimization algorithm simulator 101 repeats the evaluation (105) and determination of fitness (107) on the next generation. The blocks 105, 107, 111, and 109 repeat for each successive generation until termination criteria is met.

Although FIG. 1 depicts the constraint-compliant population module 115 as a component of the population-based optimization algorithm simulator 101, the constraint-compliant population module 115 can be a separate element from of the population-based optimization algorithm simulator 101. Further, in other embodiments, the constraint-compliant population module 115 can be utilized population-based optimization algorithm, such as a population-based optimization algorithm simulation. In FIG. 1, an population-based optimization algorithm simulator 101

Figure 2:
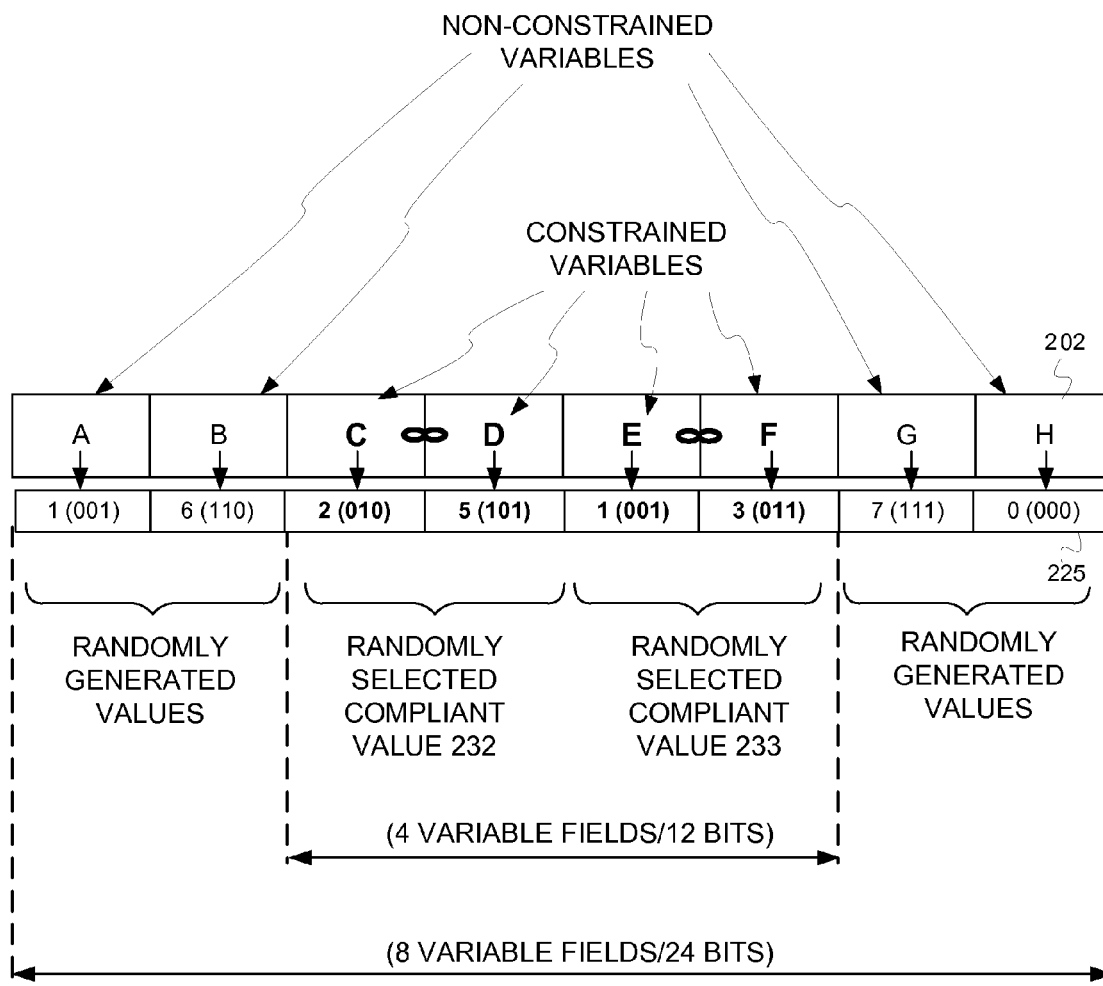
FIG. 2 is an example conceptual diagram depicting generating of at least one constraint compliant candidate-solution bit string from constraint expression analysis and random value combinations.
Figure 3:
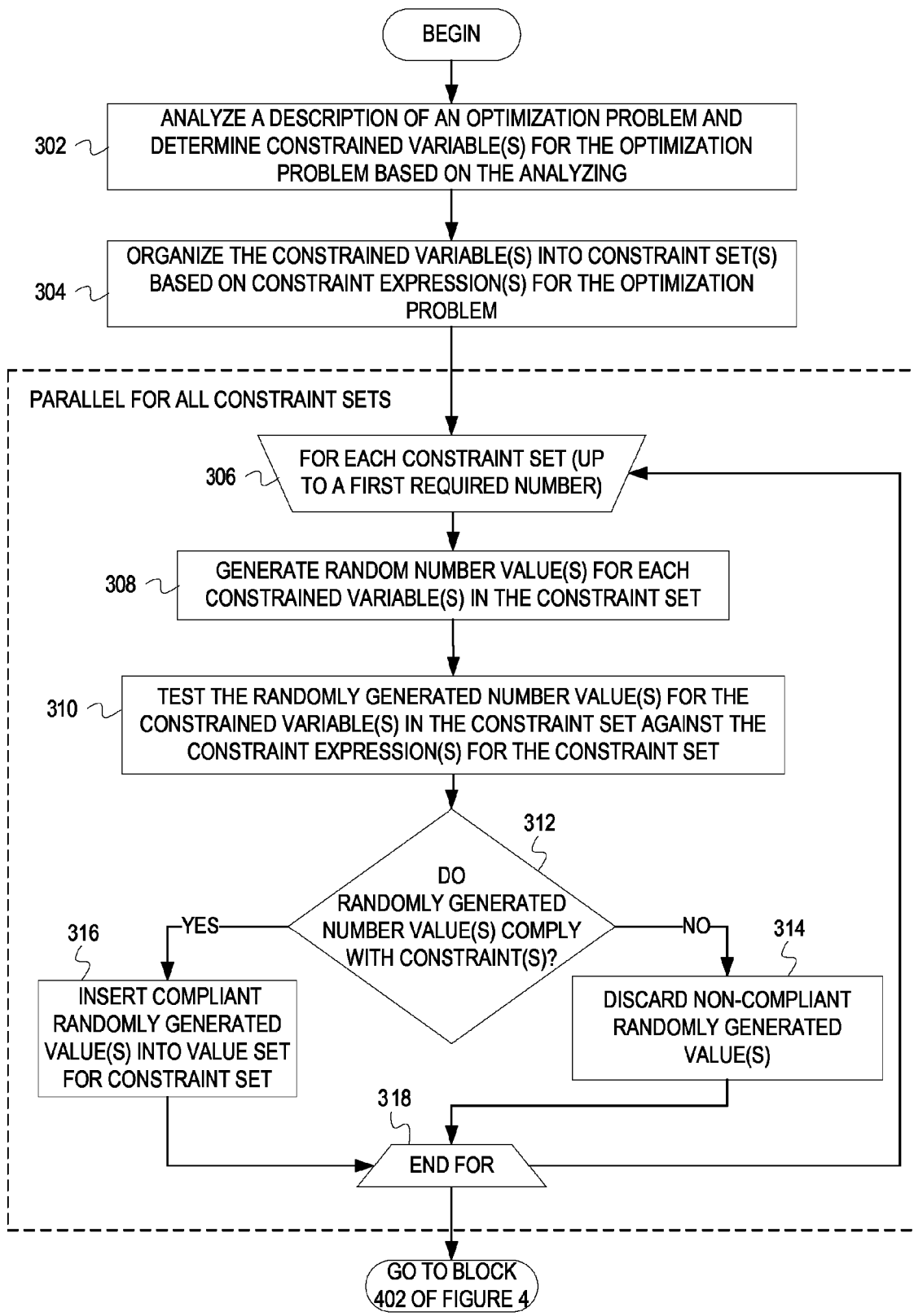
FIGS. 3-4 are flowcharts depicting example operations for generating a population of constraint compliant candidate solutions during a population-based optimization algorithm simulation.
Figure 4:
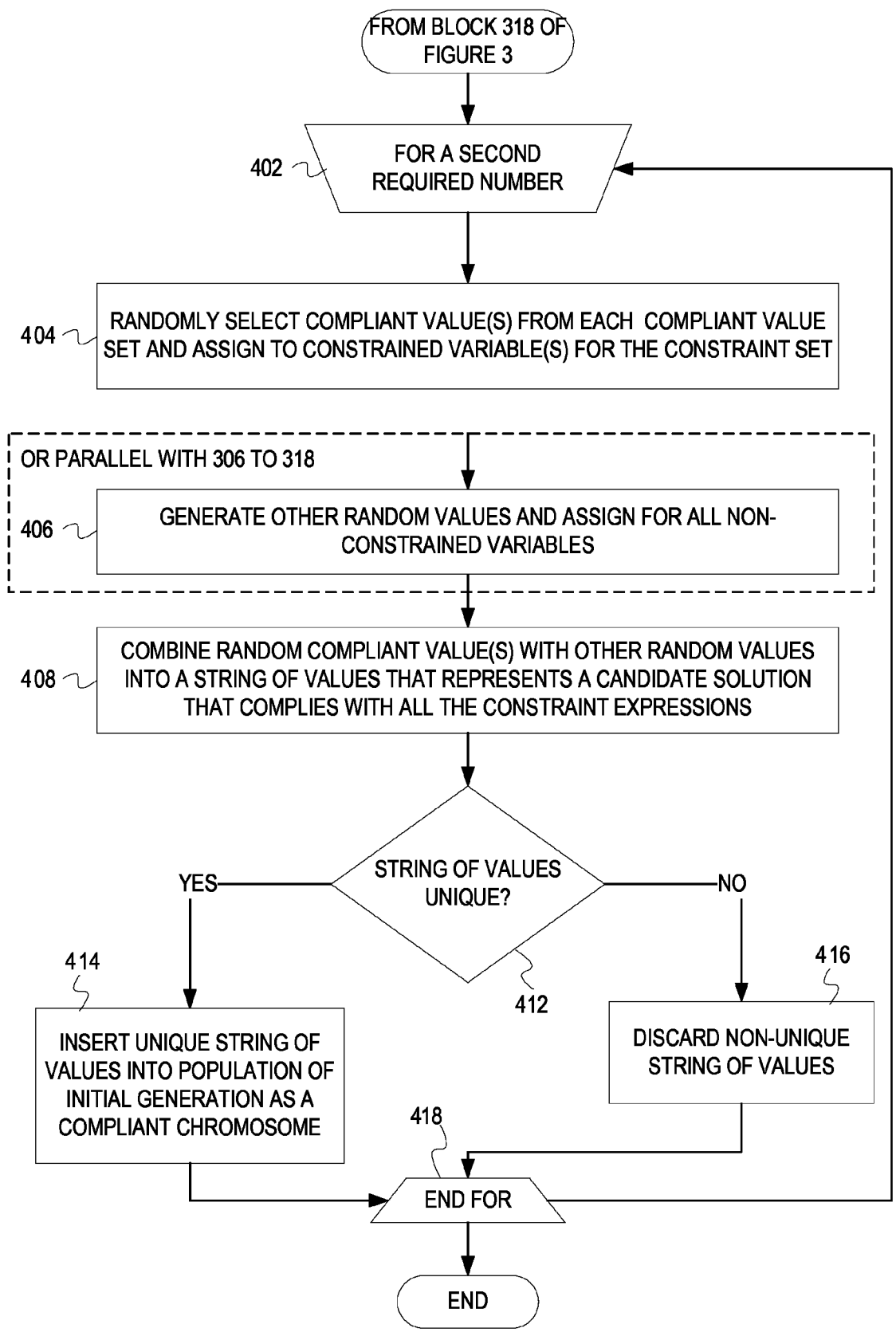

FIG. 2 is an example conceptual diagram depicting generating of at least one constraint compliant candidate-solution bit string from constraint expression analysis and random value combinations. FIG. 2 will be referred to repeatedly during the description of FIGS. 3-4. Many of the details of FIG. 2 will be described as example operations from FIGS. 3-4 and therefore a detailed explanation of FIG. 2 will not be discussed at this point in the description. Briefly, however, FIG. 2 illustrates problem constraints 201 for an optimization problem. The problem constraints 201 include a first constraint expression 210 and a second constraint expression 211. Each of the constraint expressions include a constraint set, such as a first constraint set 220 and a second constraint set 221 that correspond to the first constraint expression 210 and the second constraint expression 211. The first constraint set 220 groups together two variables "C" and "D" from the first constraint expression 210. The second constraint set 221 groups together two variables "E" and "F" from the second constraint expression 211. An constraint-compliant population module, such as the constraint-compliant population module 115, can determine a first set of compliant values ("first compliant value set") 230 and a second set of compliant values ("second compliant value set") 231 that correspond to the first constraint set 220 and the second constraint set 221. The first constraint set 230 includes a set of numerical values that comply with the first constraint expression 210. For example, when random numbers from zero to seven are repeatedly inserted into the first constraint expression 210 for the variables C and D, and the first constraint expression 210 is repeatedly evaluated using the random numbers, resulting in only valid, or compliant results, according to the conditions of the first constraint expression 210. The valid results are exemplified by the first compliant value set 231. The second compliant value set 231 is the result of repeatedly evaluating the second constraint expression 211 for the numbers zero through seven. FIGS. 3 and 4 below will refer back to FIG. 2 and explain how an constraint-compliant population module randomly selects one or more first valid, or compliant, values or grouping of values ("first compliant value") 232 and one or more second compliant values or grouping of values ("second compliant value") 233, and combines, inserts, places, positions, etc. the first compliant value 232 and the second compliant value 233 into a data string 225 for a set of variables 202 of a constrained optimization problem. The first compliant value 232 includes valid or compliant groups of values ("value grouping") for the first compliant value set 230, where each of the compliant or valid groups of values includes individual valid values that, when computed in the first constraint expression 210, cause the first constraint expression 210 to evaluate in compliance with the one or more constraint conditions. In other words, the value grouping of the first compliant value 232 causes the first constraint expression 210 to evaluate true, or to evaluate properly (i.e., correctly, without errors, etc.), according to the summation operator and greater-than operator in the first constraint expression 210 (i.e., when the first constraint expression 210 is evaluated with the values "2" and "5," their sum is greater than the value "6").

FIGS. 3-4 are flowcharts depicting example operations for generating a population of constraint compliant candidate solutions during a population-based optimization algorithm simulation. For exemplary purposes, operations associated with the blocks in FIGS. 3-4 will be described as being performed by a constraint-compliant population module for a population-based optimization algorithm simulators (", such as the constraint-compliant population module 115 of FIG. 1. At block 302, the constraint-compliant population module analyzes a description of an optimization problem and determines constrained variables for the optimization problem based on the analyzing. For example, the constraint-compliant population module determines a set of variables describing an optimization problem. The variables may also be referred to as inputs to the problem, because they can represent physical world objects that can receive, or whose states are represented by, input values and that, collectively, based on the input values result in an overall real world output value. One example of physical world objects includes a row of ballast tanks on a ship. The ballast tanks can be filled with water. The amounts of water in each tank represent the inputs, or variables. The overall amounts input into each ballast tank contribute to an overall effect of the ballast tanks on the ship or portion of the ship. The optimization problem, therefore, can represent optimized amounts of water to insert into each tank to have an optimal effect on the ship or portion of the ship. The optimal effect, for example, may be an optimal balancing of ballast tanks during a heavy storm that results in the greatest conservation of fuel for the ship. The constraint-compliant population module can further determine constraint expressions (e.g., provided by a user) that describe constraints on one or more subsets of the variables. The constraint expressions constrain, or limit, potential values for the one or more subsets of variables using symbols that are well formed according to rules or conditions (e.g., provided by a user). The symbols can designate values (e.g., constants), variables, operations, relations, formulas, inequations, inequalities, etc. or can constitute punctuation or other syntactic entities. Some expressions are equations that equal to a value. Some expressions can range from simple arithmetic operations, to more complicated constructs that include variables, functions, factorials, summations, derivatives, integrals, etc. The one or more subsets of variables that are constrained by the constraint expressions are referred to herein as constrained variables. In some embodiments, constraint expressions may be included in programming, such as subroutines, functions, etc. of a population-based optimization algorithm program, which the population-based optimization algorithm program uses to evaluate values of the constrained variables according to mathematical and/or logical (e.g., mathematical, logical, relational, equivalence, bitwise, cast, conditional etc.) operators, operations, conditions, etc. within the constraint expressions. FIG. 2, shows an example of two constraint expressions, the first constrain expression 210 and the second constraint expression 211, describing constraints for an optimization problem (i.e., the problem constraints 201) in the form of inequalities (e.g., using the greater-than ">" and less-than "<" symbols). The first constraint expression 210 and second constraint expression 211 constrain the variables C, D, E and F of the set of variables 202 (e.g., variables A, B, C, D, E, F, G, and H). The first constraint expression 210 constrains the variables C and D according to a first mathematical and/or logical relationship (e.g., the inequality statement C+D>6, meaning that the sum of variables C and D must be greater than six units). The second constraint expression 211 constrains the variables E and F according to a second mathematical and/or logical relationship (e.g., the inequality statement E+F<5, meaning that the sum of variables E and F must be less than five units). The variables C, D, E and F are all constrained because they are part of the first constraint expression 210 and second constraint expression 211 that constrain the variables C, D, E, and F within the optimization problem. All other variables from the set of variables 202 that are not constrained variables (i.e., variables that are not found in constraint expressions), such as variables A, B, G and H, are referred to herein as non-constrained variables. Referring to the real world example of the ballast tanks, the amounts of water in a row of eight ballast tanks may be identified as the variables A through H in the set of variables 202. The variables A through H from the set of variables 202 may also describe the position of the tanks in relation to each other in the row. In other words, the variable "A" may represent an amount of water in a first ballast tank in the row, the variable "B" represents an amount of water in a second ballast tank in the row next to the first ballast tank, the variable "C" represents an amount of water in a third ballast tank in the row next to the second ballast tank, and so forth, all the way to variable "H", which represents an amount of water in the eighth and final ballast tank in the row. The tanks may be in another configuration other than a row, but an example of a row simplifies the example of the optimization problem. Other embodiments may not have a spatial relationship for variables, but may include other relationships to each other included in the problem description. Thus, the first constraint expression 210 (i.e., C+D>6) can represent a first constraint on the amounts of water in the third and fourth ballast tanks in the row. The first constraint specifies that the amounts of water in the third and fourth ballast tanks must add up to more than six units of water. For instance, the third and fourth tanks may function as emergency water reserve on the ship (e.g., for firefighting) and, therefore, may be required to always have more than six units of water. The second constraint expression 211 (i.e., E+F<5) can represent a second constraint on the amounts of water in the fifth and sixth ballasts tanks in the row. The second constraint specifies that the amounts of water in the fifth and sixth ballast tanks must add up to less than five units of water. For instance, the fifth and sixth tanks may be over a part of the ship that is structurally weaker than the parts of the ship under the other ballast tanks (e.g., structurally weaker by design, structurally weaker by damage, etc.), and therefore the weight of the fifth and sixth ballast tanks is required to be less than the weight of five units of water.

At block 304, the constraint-compliant population module organizes the constrained variables into constraint sets based on constraint expressions for the optimization problem. In some embodiments, some constrained variables can be related to each other by the expressions. For example, referring again to FIG. 2, the first constraint expression 210 relates the variables C and D. A constraint-compliant population module can (e.g., via block 304) group variables C and D into the first constraint set 220 using the first constraint expression 210. The constraint-compliant population module can group the variables E and F into the second constraint set 221 using the second constraint expression 211. In some embodiments, a constraint expression may relate more than two variables to each other. For instance, a third constraint expression may link the first constraint expression 210 and the second constraint expression 211 to each other. For instance, a third expression, D+E>4, relates D and E, both of which are variables that are in the first constraint expression 210 and the second constraint expression 211. Therefore, according to algebraic manipulation, all of the variables, C, D, E and F, can be related to each other, and thus, the constraint-compliant population module could organize variables C, D, E, and F into one constraint set. In some embodiments, a constraint expression may not relate to multiple variables, but may instead only constrain one variable. For example, an additional constraint expression, G<3, would only constrain one variable. Thus, the constraint-compliant population module could organize the one variable G into a constraint set containing only one constrained variable.

At block 306, the constraint-compliant population module performs the blocks 306 to 318 for each constraint set organized via block 304, up to a first required number. For example, the first required number may be a number equivalent to a required population size of compliant, or feasible, candidate solutions for a population of a generation (e.g., an initial generation) of a population-based optimization algorithm. In another example, the first required number may be a time out number.

At block 308, the constraint-compliant population module generates random number values for each of the constrained variables in the constraint set. A grouping, or field, of bits ("field") can represent each of the constrained variables. In some embodiments, a string of binary bit values represents a single value for the variable. In some embodiments, the string of binary bit values does not exceed a maximum value for the variable. The length for the fields can be related to a maximum magnitude of value for the input values of the problem variables. For example, referring to the physical world problem of the ballast tanks, each of the ballast tanks may have a maximum limit of seven (7) units of water and a minimum value of zero (0) units of water, which is a range of eight (8) unit values. To represent the range of eight unit values (e.g., from zero units up to seven units), requires a field that is at least three bit longs (i.e., would require a string of 1's and/or 0's that are at least 3 bits long). The maximum limit of seven units of water per tank are examples of properties of the variables included in a description of the optimization problem. As an example, the constraint-compliant population module can generate the random values "2" for the variable C and "5" for the variable D.

At block 310, the constraint-compliant population module tests the randomly generated number values for the constrained variables in the constraint set against the constraint expression(s) for the constraint set. The constraint-compliant population module can insert the randomly generated number values into the constraint expressions via the constrained variables within the constraint expression and evaluate the constraint expressions using the inserted randomly generated number values. For example, in FIG. 2, the numbers "2" and "5" may be randomly generated and evaluated for the first constraint expression 220 (i.e., C+D>6).

At block 312, the constraint-compliant population module determines whether the randomly generated number values comply with the constraint expressions. Determining whether a randomly generated number value complies with a constraint expression can mean to determine that the constraint expression evaluates properly, or returns a valid result, when the randomly generated number values are inserted into the constraint expression. In other words, the constraint-compliant population module determines that randomly generated number values satisfy all mathematical and/or logical conditions, or constraints, of the constraint expression when the constraint-compliant population module evaluates the constraint expression.

At block 312, if the constraint-compliant population module determines that the randomly generated number values do not comply with the constraint expression, the flow continues at block 314. At block 314, the constraint-compliant population module discards any randomly generated number values that do not comply with the constraint expressions for the constraint set.

At block 312, if the constraint-compliant population module determines that the randomly generated number values do comply with the constraint expression, the flow continues at block 316. At block 316, the constraint-compliant population module inserts any randomly generated number values that do comply with the constraint expressions into a set of feasible, or compliant, values ("compliant value set") for the constraint set. This forms a compliant value set for each of the constraint sets, and thus, may result in a plurality of compliant value sets. For instance, in FIG. 2 the compliant value set 230 for the first constraint expression 210 includes a combination the values of "2" and "5" as one combination of values that work for C or D at the same time. The one combination of compliant values (e.g., the "2" and "5") are a bundle of compliant randomly generated number values that comply with the constraints in a dependant way. For instance, the one combination of "2" and "5" values assigned to C and D, are only are valid when bundled or tied together as a valid combination. If they were independent, or unbundled from each other, they would merely be random values and could lack validity.

At block 318, the constraint-compliant population module terminates the loop that began at block 316 by determining whether the inserted randomly generated number values have reached the first required number for all value sets. If the inserted randomly generated number values reach the first required number, the flow continues at block 402 of FIG. 4. If the inserted randomly generated number values do not reach the first required number, the flow returns to block 306 and repeats. As stated previously, the first required number may be equivalent to a required population size of feasible or compliant candidate solutions for a population of a generation (e.g., an initial generation) of a population-based optimization algorithm. In other embodiments, the first required number may instead be a time out number. Specifically, there may need to be a timeout, or maximum number of iterations for the loop of blocks 306 to 318. For instance, for practical reasons, in cases where there are a large number of constrained variables, and randomly generating values starts to take too long, then it may be necessary to close the loop. Further, if the constraint-compliant population module fails to find a compliant value set of a size equal to the population size, the constraint-compliant population module can reuse compliant values combined with other values for other variables. In some embodiments, the constraint-compliant population module can also perform blocks 306 to 318 in parallel for all constraint sets at the same time.

Flow continues at block 402 of FIG. 4. FIG. 4 continues from FIG. 3. At block 402, the constraint-compliant population module begins a second loop for a second required number. The second number may be equivalent to a required population size of feasible or compliant candidate solutions for a population of a generation of a simulation of a population-based optimization algorithm.

At block 404, the constraint-compliant population module randomly selects a compliant value from each of the compliant value sets for each constrained variable associated with the constraint set. For example, in FIG. 2, the constraint-compliant population module can select the first compliant value 232, at random, from all other values in the first compliant value set 230. The first compliant value 232 may include groupings of values (e.g., a pairing of values according to first constraint expression 210 that mutually constrains the two variables "C" and "D"). The "2" field value for the variable C along with the "5" field value for variable D are compliant with the constraints for the first constraint set 220. The constraint-compliant population module can further, extract the second compliant value 233, which, for example, includes the "1" field value for the variable E along with the "3" field value for variable F, because the "1" and "3" field values together are compliant with the constraints for the second constraint set 221.

At block 406, the constraint-compliant population module generates and assigns other random values for all non-constrained variables. Referring back to FIG. 2, the constraint-compliant population module generates the random values of 1, 6, 7, and 0. The constraint-compliant population module then assigns the random values of 1, 6, 7, and 0 respectively to the fields for the non-constrained variables A, B, G, and H. The random values are not constrained, and therefore, can be any values. Note that block 406 can be performed in parallel with the blocks 306 to 318 or it can be performed after all iterations of blocks 306 to 318 are complete.

At block 408, the constraint-compliant population module combines random compliant value(s) with other random values into a string of values that represents a candidate solution that complies with all the constraint expressions. The constraint-compliant population module combines each of the random compliant values for fields assigned to each of the constrained variables with each of the random values for fields assigned to each non-constrained variable into a bit string that represents a candidate solution (e.g., a chromosome), that complies with all the constraint expressions for the optimization problem. In some embodiments, the candidate solution that complies with all the constraint expressions may be referred to as a constraint-compliant candidate solution ("compliant candidate solution"). FIG. 2 shows an example of a string of values (i.e., the data string 225) as one example of a compliant candidate solution (e.g., the data string 225 equates to the values 1, 6, 2, 5, 1, 3, 7, and 0 in sequence for eight fields). The string of values, or data string 225, may be referred to as a chromosome, an individual, or any other term normally associated with population-based optimization algorithms (e.g., genetic algorithms). The data string 225 represents a compliant candidate solution that can be included in a population (e.g., an initial population) of candidate solutions that a population-based optimization algorithm can test for fitness. The data string 225 may be a large string of bit-values made up of the smaller binary bit strings for each of the fields. In FIG. 2, each field for each variable may be three bits long. Further, because there are eight variables, the large string of bit values that makes up the data string 225 is eight times three (8×3) bits long, or twenty-four (24) bits long. The constraint-compliant population module generates the string 225 in an intelligent fashion, by selecting only random values from the value sets that are known to comply with the constraint expressions. For instance, because there are only four constrained variables in the set of variables 202, and there are only two constraint sets, then the constraint-compliant population module only needs to perform random testing for twelve bits of data versus twenty-four bits of data. The constraint-compliant population module thus can generate compliant candidate solutions in much less time because randomly testing for twelve bits of values includes much fewer combinations of values to test than testing for a twenty-four bits of values. Some conventional population-based optimization algorithm methods would simply generate random twenty-four-bit long strings of values, without regard to constraints, and then would test the random twenty-four-bit long strings of values, one at a time, to see if the randomly generated twenty-four-bit long string complied with the constraints. The conventional population-based optimization algorithm, therefore, could conceivably generate and test hundreds or thousands of random twenty-four-bit long strings of values before finding even one that complied with the constraints. Thus, a conventional population-based optimization algorithm would waste tremendous amounts of time and computing resources and may not produce enough number of compliant candidate solutions to fill a population for a generation of a population-based optimization algorithm within a search time. However, some embodiments avoid spending time testing for purely random twenty-four-bit values, but instead first perform the blocks 306 to 318, finding compliant values for constrained variable fields, then randomly selecting those compliant values from constraint sets before generating full bit strings for a complete candidate solution. Thus, in the example shown, in FIG. 2, the constraint-compliant population module only needs to run random testing on twelve bits of data associated with the variables C, D, E and F instead of generating random values for all twenty-four bits of data associated with the fields for variables A through H. In some embodiments, the constraint-compliant population module can use only unique values from the compliant value sets. In other words, the constraint-compliant population module can avoid reusing the same compliant value from the compliant value sets for each iteration of block 408, but, instead, can track the compliant values already used from the compliant value set and use different values. This will produce a more diverse population of compliant candidate solutions. If there are fewer numbers of compliant values in the compliant value set than are needed for a number of compliant candidate solutions in a given population, such as an initial population, then the constraint-compliant population module can cycle through the compliant values of the compliant value set and reuse some compliant values.

At block 412, the constraint-compliant population module can test each string of values, or compliant candidate solution, generated by blocks 408 for uniqueness. If the constraint-compliant population module determines, at block 412, that the string of bit values is unique from other strings of bit values already inserted into the population, then, at block 414, the constraint-compliant population module adds the unique bit-string (i.e., the unique compliant candidate solution), to the population of the generation for the population-based optimization algorithm. If the constraint-compliant population module determines at block 412 that the string of bit values is not unique from other strings of bit values already inserted into the population, then, at block 416 the constraint-compliant population module can discard the non-unique, bit string.

At block 418, the constraint-compliant population module can end the loop when the second required number has been reached.

Further, although one real world example of an optimization problem was present above regarding ballast tanks, one skilled in the art will appreciate that embodiments can be used to optimize all types of optimization problems such as problems regarding electronics, thermodynamics, physics, aeronautics, acoustics, etc. For instance, instead of optimizing amounts of water in ballast tanks on a ship, an optimization problem may optimize voltage levels on outputs of an electronic component, sequences of actions performed by manufacturing equipment during an assembly process, shipping routes for delivery vehicles on a trade route, etc. Further, although the example of the ballast tanks included variables for of only one type of problem input, water, other examples may include variables for multiple types of problem inputs (e.g., variables in an electronic design can include transmission line length, transmission line spacing, driver strengths, etc. as variables that affect the optimization problem).

In some embodiments, the constraint-compliant population module may perform non-repeating searches to generate compliant values. For instance, the constraint-compliant population module can use linear feedback shift registers (LFSR's), to perform searches of possible values for constrained variables in a pseudo-random order, ensuring randomness and completeness. In some embodiments, the constraint-compliant population module can perform compiler optimizations in connection with organizing constrained variables and working with constraint expressions. For example, the constraint-compliant population module can propagate constants, remove conditional expressions, remove variables that are AND'ed with 0, etc. The constraint-compliant population module can thus reduce complexities of problem and reduce time to evaluate constraint expressions. In some embodiments, the constraint-compliant population module can also perform logical manipulations, such as logical algorithms using DeMorgan's law, to obtain expression trees with a disjunction at the root. The population generation can then split constraint expressions, such as where the root of the expression tree is a disjunction (e.g., logical OR), as the root embodies multiple constraints. By splitting large expression trees into little expression trees, the constraint-compliant population module can reduce sizes of the groups of constrained fields and sizes and numbers of constraints each group must be checked against.

Embodiments are not limited to the example flowcharts depicted in the above figures. Embodiments can perform additional operations, fewer operations, operations in parallel, etc. For instance, referring to FIG. 3, the operations for generating compliant value sets (e.g., operations at blocks 306-318) can occur in parallel for each of the constraint sets. Further, in another example, referring to FIG. 4, the operations for generating random values and assigning the random values to non-constrained variables (e.g., operations at block 406) can occur in parallel with the operations at blocks 306-318.

Furthermore, although some embodiments described above referred to constraint expressions that evaluate to a true or non-zero value as one type of constraint description, other embodiments may use other types of constraint descriptions, such as constraint functions or constraint code-blocks (e.g., C-language statements) instead of, or in addition to, constraint expressions. The constraint functions or code-blocks may include loops, branches, and intermediate values that specify complex constraints. Some embodiments can parse, analyze, etc. functions, code-blocks, etc. to determine (e.g., ascertain, obtain, extrapolate, calculate, etc.) expressions.

Further, to improve efficiency, some embodiments can optimize constraint expressions, for example, to reduce a complexity of an optimization problem or reduce a time to evaluate constraint expressions. Some embodiments, for instance, can, via compiler optimizations, optimize constraint expressions to propagate constants, remove conditional expressions, and remove fields that are AND'ed with zero. Some embodiments can split constraint expressions where a root of an expression tree is a disjunction (e.g., logical OR), as such roots embody multiple constraints. Splitting constraint expressions can break large expression trees into little ones, thus reducing a size of groups of constrained fields, and a size and number of constraints each group must be checked against. Logical manipulations, like functions that utilize DeMorgan's law, may be applied to obtain expression trees with a disjunction at the root to allow expression trees to be broken down.

Figure 5:
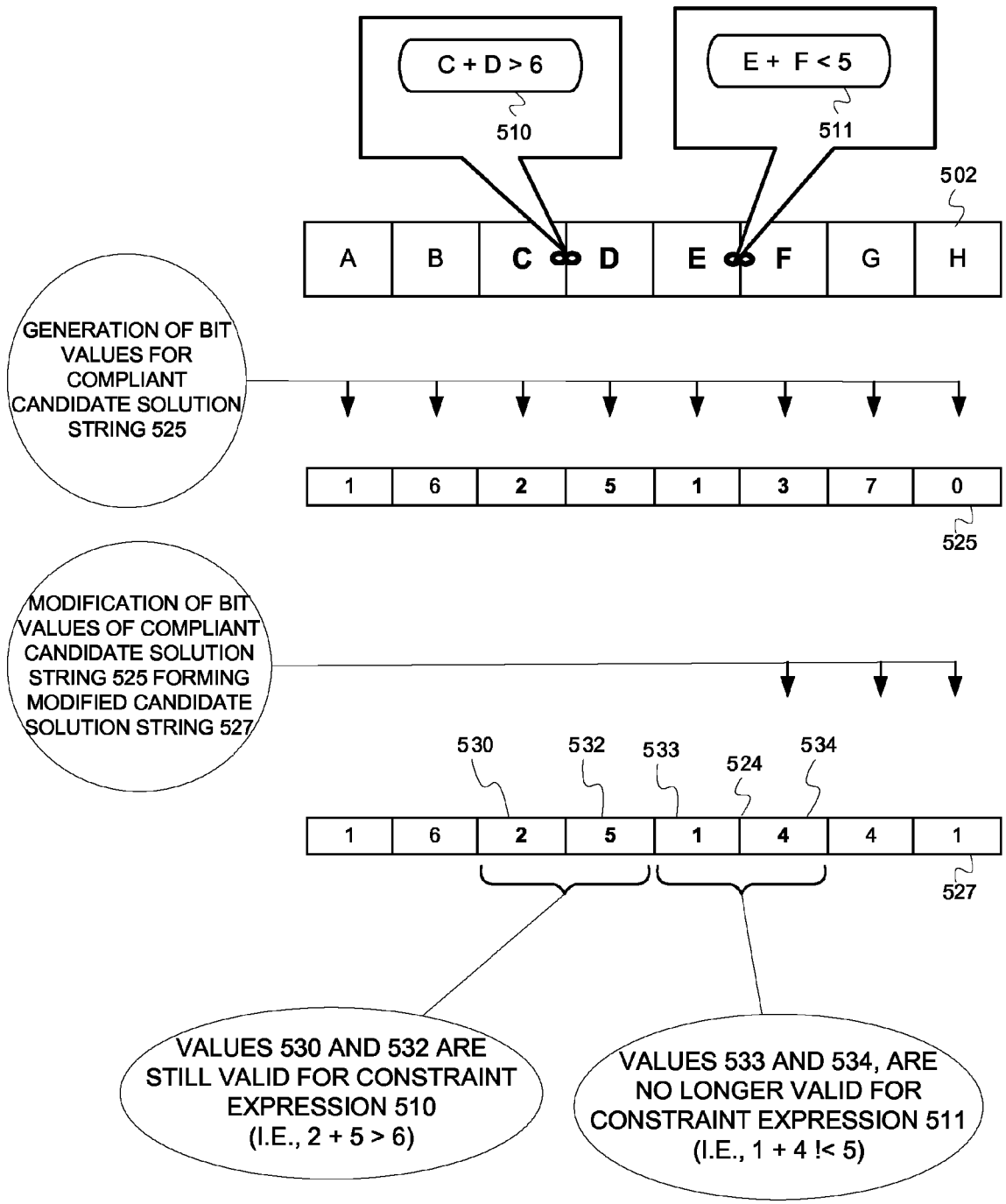
FIG. 5 is an example conceptual diagram that illustrates modification of bit values of a compliant candidate solution.
Figure 6:
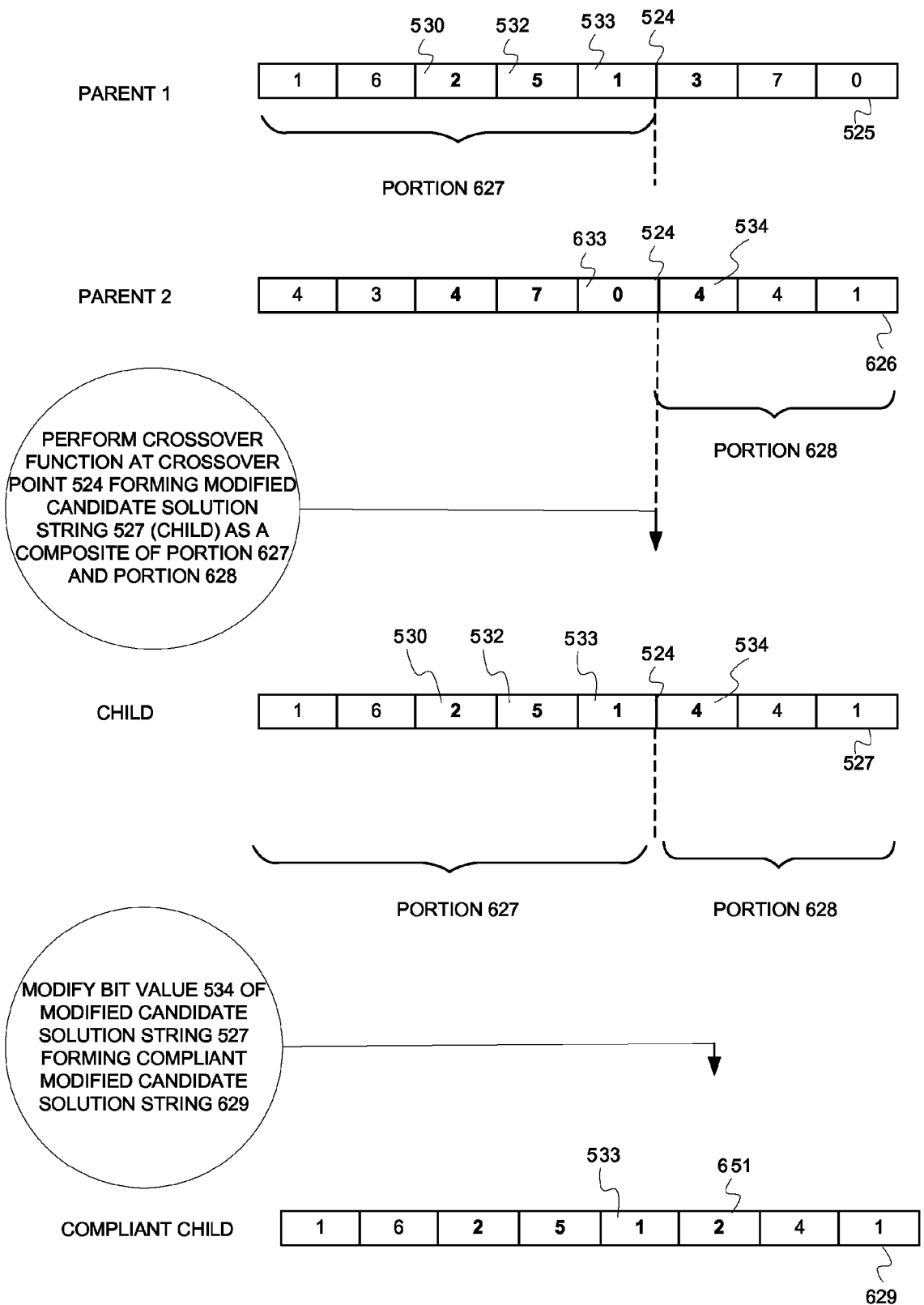
FIG. 6 is an example conceptual diagram of performing constraint compliant crossovers during a population-based optimization algorithm simulation.
Figure 7:
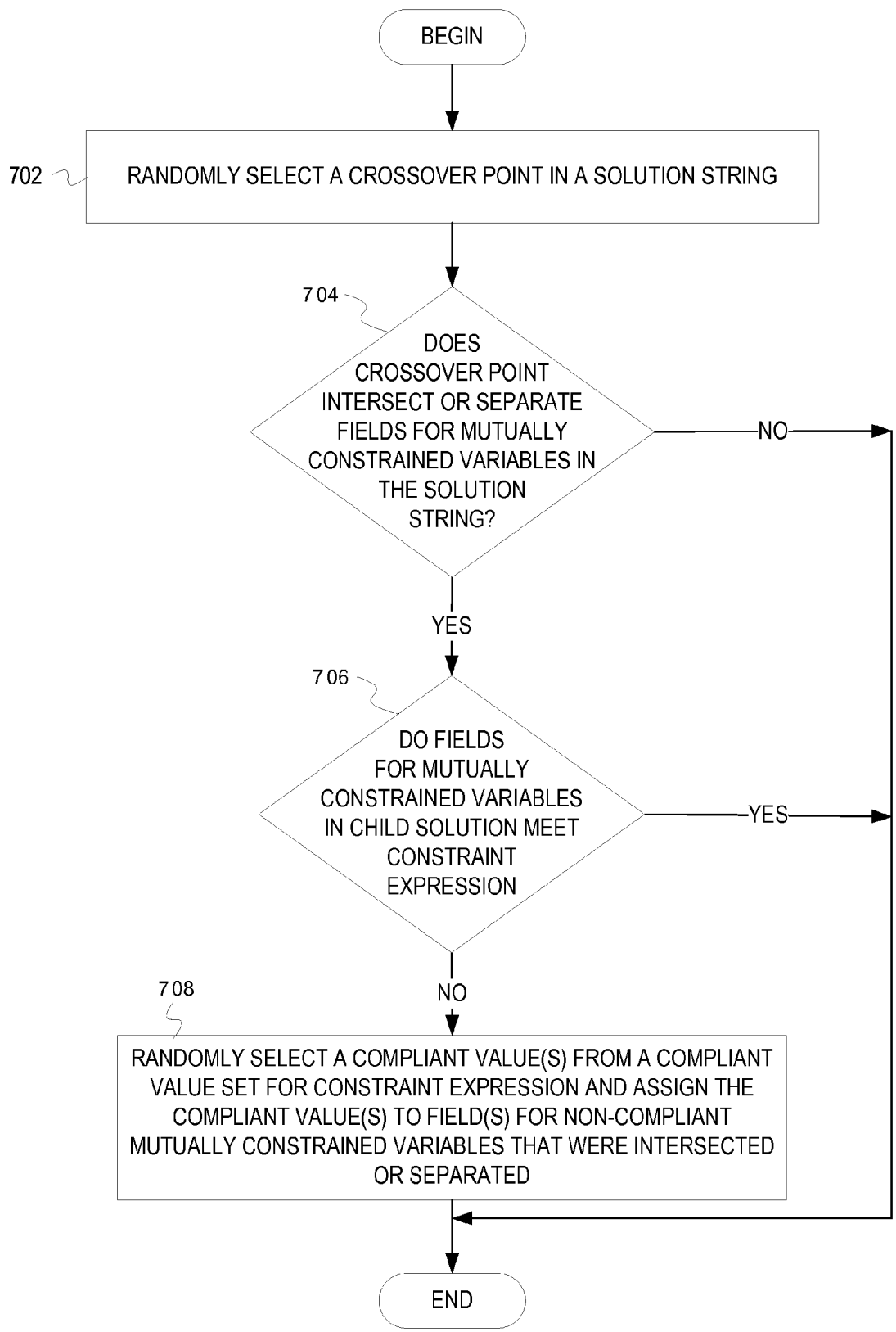
FIG. 7 is a flowchart depicting example operations for performing constraint compliant crossovers during a population-based optimization algorithm simulation.

Further, in addition to generating or populating generations of constraint compliant candidate solutions, some embodiments may perform constraint compliant modifications of constraint compliant candidate solutions (e.g., recombinations via objective functions, mutations via mutation functions, crossovers via crossover functions, etc.). For instance, if a candidate solution is selected to undergo mutation, some embodiments can select a different set of compliant values to replace an existing set of compliant values for fields that represent variables within the candidate solution. Other embodiments can randomly mutate any values (e.g., field values, bits, etc.) of a candidate solution, and then check field values for mutually constrained variables for the mutated candidate solution to determine whether the field values for the mutually constrained variables for the mutated candidate solution comply with the constraints. Some embodiments can preserve sets of compliant values by passing the compliant values to offspring as a set. Some embodiments can analyze two parent solutions to determine all crossover points that do not violate a constraint, and randomly choose from those points so that mutually constrained variables remain compliant. Other embodiments, however, can randomly select crossover points for two, or more, parent candidate solutions, perform a crossover that generate a child candidate solution, and then test whether the values of fields for mutually constrained variables for the child candidate solution are compliant. FIGS. 5, 6, and 7 illustrate some examples.

FIG. 5 illustrates an example of a set of variables 502 (e.g., variables A, B, C, D, E, F, G, and H) similar to the set of variables 202 described in FIG. 2. The set of variables 502 is a model that correlates, or assigns, variables to fields of bit values in a string for a candidate solution (i.e., variable A correlates or is assigned to a first field of bit values in a bit string for a candidate solution, variable B correlates or is assigned to a second field of bit values in the bit string, and so forth). The set of variables 502 are subject to expressions 510 and 511 (e.g., specified via user input at a simulator). In the expression 510, variables C and D are mutually constrained (i.e., C+D>6). In the expression 511, variables E and F are mutually constrained (i.e., E+F<5). A population-based algorithm simulator ("simulator") may generate a compliant candidate solution string 525 (e.g., via embodiments described in FIGS. 1, 2, 3 and/or 4) during a population-based optimization algorithm simulation ("simulation"). As part of the simulation, the simulator may perform procedures that modify the compliant candidate solution string 525 into a modified candidate solution string 527, such as via recombination function, a crossover function, a mutation function, etc.

For instance, in FIG. 6, the simulator may splice, or separate, the compliant candidate solution string 525 at common crossover point 524 and also splice an additional candidate solution 626 at the common crossover point 524 (e.g., at the same location on a bit string), resulting in the modified candidate solution string shown in FIG. 5 and also shown in FIG. 6. The common crossover point 524 happens to splice the compliant candidate solution string 525 and the additional candidate solution 626 in between field values. Other embodiments, however, may splice somewhere within a field, separating the field. In the context of FIG. 6, the compliant candidate solution string 525 may also be referred to as "parent 1" and the additional candidate solution 626 may be referred to as "parent 2." The simulator takes a first component part (i.e., portion 627) of parent 1 (i.e., the bit values for the first five fields of the compliant candidate solution string 525) and a second component part (i.e., portion 628) of parent 2 (i.e., the bit values for the last 3 fields of the additional candidate solution 626), and creates a composite or "child" candidate solution, the modified candidate solution string 527, from the portion 627 and portion 628.

The modified candidate solution string 527, however, must still satisfy all problem constraints to be a viable candidate solution. For instance, the bit values for fields 530 and 532, which correlate with variables C and D for the set of variables 502 for the modified candidate solution string 527, must still comply with the constraint expression 510. Also, bit values for fields 533 and 534, which correlate with variables E and F must also comply with the constraint expression 511. Fields 530 and 532 are bit strings that respectively equate to values of "2" and "5," which when added together, comply with the constraint expression 510 (i.e., "2" plus "5" are greater than "6"). However, the bit values for field 533 (i.e., "1") and the bit values for field 534 (i.e., "4") correlate with variables E and F, which, when added together, do not comply with the constraint expression 511 (i.e., "1" plus "4" is not less than "5").

Figure 8:
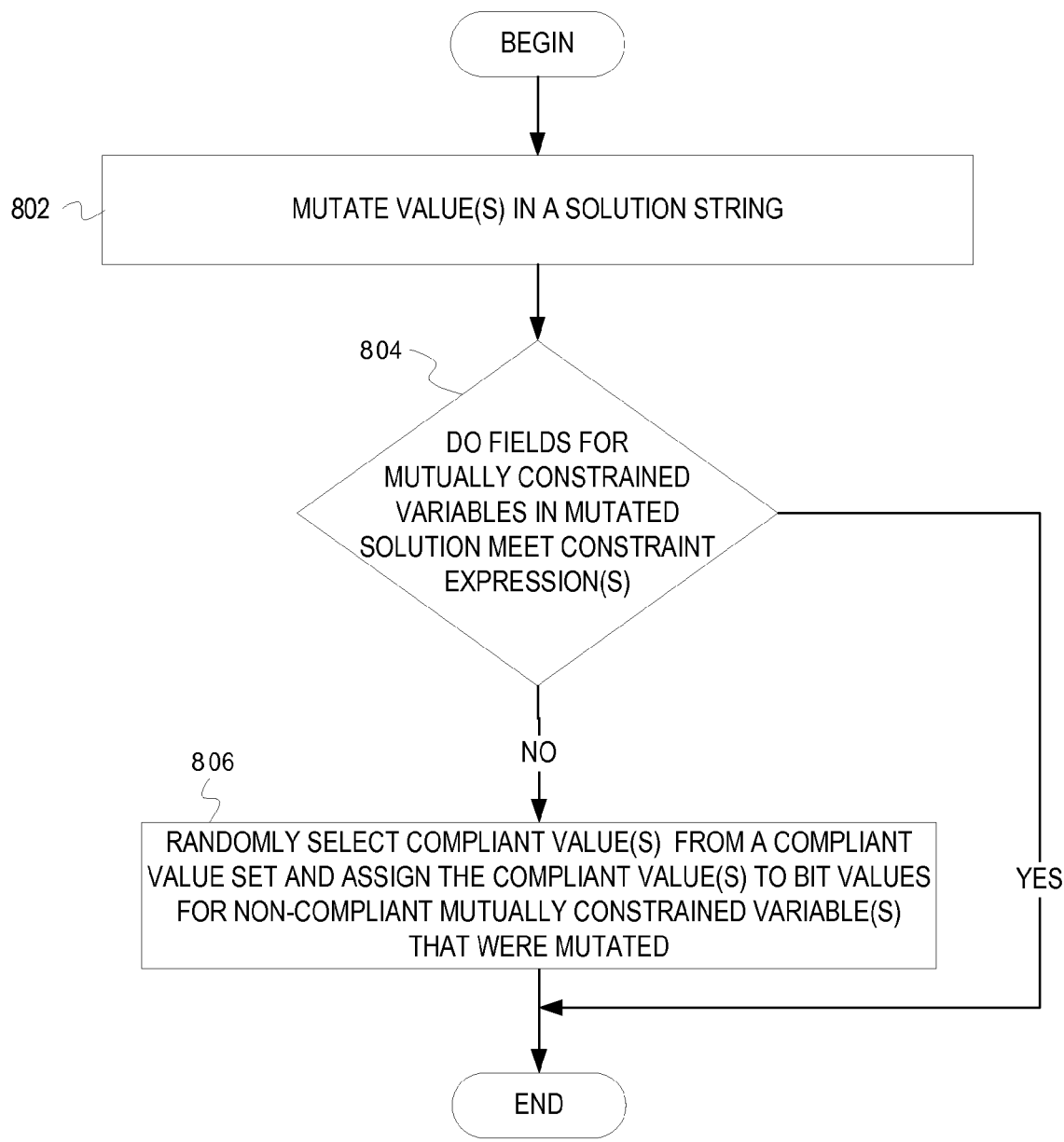
FIG. 8 is a flowchart depicting example operations for performing constraint compliant mutations during a population-based optimization algorithm simulation.

To ensure compliance with the problem constraints, some embodiments perform flow 700 and/or flow 800, as illustrated in FIGS. 7 and 8. For example, FIG. 7 illustrates an example of checking constraint compliance for a modified candidate solution modified via a crossover procedure in a population-based optimization algorithm simulation. In FIG. 7, the flow 700 begins at processing block 702 where the simulator randomly selects a crossover point in a candidate solution bit string ("solution string"). For instance, as described in FIG. 6, the simulator can select the common crossover point 524 randomly.

Returning to FIG. 7, the flow 700 can continue at processing block 704, where the simulator determines whether the crossover point intersects or separates fields for mutually constrained variables in the solution string. For instance, as in FIG. 6, the crossover point 524 intersects the fields 633 and 534 for the mutually constrained variables E and F within the additional candidate solution 626, but does not intersect the fields 530 and 532 for the mutually constrained variables C and D from the compliant candidate solution string 525. The simulator knows that fields 530 and 532 come from valid candidate solution and were not intersected (i.e., spliced between mutually constrained fields) or separated (i.e., spliced in the middle of a field that is constrained) during crossover. Therefore, the simulator would not need to check whether the fields 530 and 532 are constraint compliant because they will remain constraint compliant during the crossover. However, the simulator determines that because the crossover point 524 intersected the fields 633 and 534 from the additional candidate solution 626, the simulator needs to check whether the new combination of values 533 and 534 from the modified candidate solution string 527 are compliant with the constraint expression 511.

The flow 700 continues at processing block 706, where the simulator checks, or determines, whether the fields for mutually constrained variables that were intersected or separated meet constraint expressions. As described above, the simulator must determine whether the fields 533 and 534 of the modified candidate solution string 527 comply with the conditions of the constraint expression 511. If simulator were to determine that the fields 533 and 534 are compliant, the flow 700 can end. However, as shown in FIG. 6, the fields 533 and 534 are not compliant (i.e., the field values "1" plus "4" are not less than "5").

The flow 700 continues at processing block 708, where the simulator randomly selects one or more compliant values from a compliant value set for the constraint expression and assigns the one or more compliant values to one or more fields for the non-compliant mutually constrained variables that were intersected. For example, the simulator could hold one valid value steady for one field while modifying another field to ensure compliant. For instance, in FIG. 6, the simulator can hold the value for field 533 steady (i.e., hold the value "1" at the value "1") and perform an additional search for values that meet the constraint when "1" is held constant (e.g., only values "0," "1," "2," and "3," when used with the value "1," meet the constraint of E+F<5). This additional search would be much smaller than checking whether all mutually constrained variables are compliant because the simulator does not have to check all mutually constrained variables (e.g., do not have to check that both E and F mutually meet the constraint, just test field values of F that meet the constraint with a valid field value for E). For example, in FIG. 6, the simulator can hold the value of field 533 steady and select a new value for field 651 that is compliant with the constraint expression 511, thus generating a compliant modified candidate solution string 629. If neither of the new values would meet the constraint, then the simulator can randomly select a set of compliant values from the compliant value set to replace all of the fields for the mutually constrained variables (e.g., replace fields for both E and F). In other embodiments, if at block 706, the simulator determines that any of the fields for mutually constrained variables do not meet or satisfy the constraint expression, the simulator could randomly select compliant values from the compliant value set for all mutually constrained values. In other words, for example, in FIG. 6, the simulator could determine that the value for field 533 (i.e., the value "1") plus the value for field 534 (i.e., the value "4") are not less than five and can randomly select from any mutually constrained value grouping from a compliant value set for the constraint expression 511 (e.g., select the value paring "2" and "2" at random from the compliant value set 231 shown in FIG. 2, then replace the values for field 533 and field 534 with the "2" and "2" values).

In FIG. 8, at processing block 802, the simulator can select a candidate solution (e.g., a bit string) and mutate one or more values in a candidate solution. The simulator can select the candidate solution randomly, based on fitness, based on analysis of criteria indicated in an objective function, or in other ways. At processing block 804, the simulator can determine whether fields for any mutually constrained variables that were modified by the mutating of processing block 802, continue to comply with constraint expressions. For example, in FIG. 9, the simulator may mutate randomly selected values from the compliant candidate solution string 525 to generate the mutated candidate solution 926. Some of the fields 930, 931, 932, 933 correspond to constrained variables that may be mutually constrained (e.g., fields 930 and 931 are mutually constrained, such as by constraint expression 510 and fields 932 and 933 are mutually constrained, such as by constraint expression 511). At processing block 806, the simulator randomly selects one or more compliant values from a compliant value set and assigns the one or more compliant values to fields for non-compliant mutually constrained variables. The simulator can perform processing block 806 similarly as described for processing block 708. For instance, the simulator can hold one compliant bit value constant and replace only non-compliant mutated bit value(s). For example, in FIG. 9, the fields 940 and 931 from the mutated candidate solution 926 do not comply with the constraint expression 510 (i.e., "0" plus "5" is not greater than "6"). As a result, the simulator can hold the "5" value steady, search for values for fields that would comply with the "5" value (i.e., values "2,"

"3," "4," "5," "6", and "7", when combined with "5" comply with the constraint expression 510) and randomly select one of those values to replace the bits for the field 940 (i.e., randomly select the value "5" as the new value of field 950, resulting in the compliant mutated candidate solution 927). The simulator could, however, have just replaced values for both fields 940 and 931 from the mutated candidate solution 926 with a bit value grouping from a compliant value set (e.g., randomly select any of the compliant value pairings from the compliant value set 230 of FIG. 2).

In some embodiments, a simulator can select and mutate additional bit values (e.g., entire fields, portions of fields, etc) for mutually constrained variables that were not previously mutated until the mutated candidate solution becomes compliant. For example, in FIG. 9, if the simulator mutated bit values for the field 942 to be the value "3", then the mutated bit values for the field 942 with the value "3", combined with the mutually constrained bit values for the field 933 also of the value three "3," would not satisfy the conditions of the constraint expression 511 (i.e., $3+3\leq5$). However, instead of modifying the mutated bit values for field 942 of the value "3" to make it comply with the non-mutated, mutually constrained bit values of field 933, the simulator could instead mutate the mutually constrained bit values of field 933 until satisfying the conditions of the constraint expression 511 when the mutated bit values of field 942 stays at "3." For instance, the simulator can calculate a set of compliant values for the mutually constrained bit values of field 933 that, when any of which are combined with the value of "3" for the mutated bit values of field 942 within the constraint expression 511, combine to values less than "5" (i.e., the set of compliant values "0," and "1"). The simulator can then randomly select from one of the set of compliant values (e.g., randomly select "1") and replace the value of the mutually constrained bit values of field 933 with the randomly selected one of the set of compliant values (i.e., replaces the value "3" of the field 933 with the value "1" in the compliant mutated candidate solution 927).

In some embodiments, the simulator can select a crossover point that matches up compliant values. For example, the simulator can analyze a population of bit strings to find one bit string in the population that includes valid bit values at a location on the bit string that corresponds to non-valid bit values on a mutated bit string. For instance, in FIG. 9, if the mutually constrained bit values of field 933 are non-valid, the simulator can search for (e.g., analyze and find) a first parent bit string in a recently generated population that includes a valid value at the location of the mutually constrained bit values of field 933, then perform a crossover function that splits the mutated candidate solution 926, as a second parent bit string, between the mutated bit values of field 942 and the mutually constrained bit values of field 933. In other words, the simulator splits the mutated candidate solution 926 and the first parent bit string at a common cross over point so that the last three fields of bit values in the mutated candidate solution 926 are separated from the mutated candidate solution 926. The simulator then replaces the last three fields of bit values of the mutated candidate solution 926 with the last three fields of bit values of the first parent bit string. In other words, the simulator connects the last three fields of bit values of the first parent bit string at a connection point that corresponds to the common crossover point. The result is a child bit string that includes valid values according to constraint conditions.

Embodiments may also include checking constraints, as described above, for crossovers that utilize multiple crossover points, for crossovers that utilize more than two parents, for mutation that mutate multiple variables, and for combinations of crossovers and mutations that occur on a potential solution between generations. Further, although some embodiments describe selecting crossover points that intersect fields without separating bit values of the fields, other embodiments separate bits within a field (e.g., an 8-bit field that is constrained, either by itself or as part of mutually constrained set, where the crossover splits the 8-bit field in the middle, separating the field into upper four bits and lower four bits). Embodiments can also recombine, or reconnect, component parts of parent bit strings during a crossover for fields that were separated (e.g., combines the upper 4 bits from one parent and the lower 4 bits from another).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
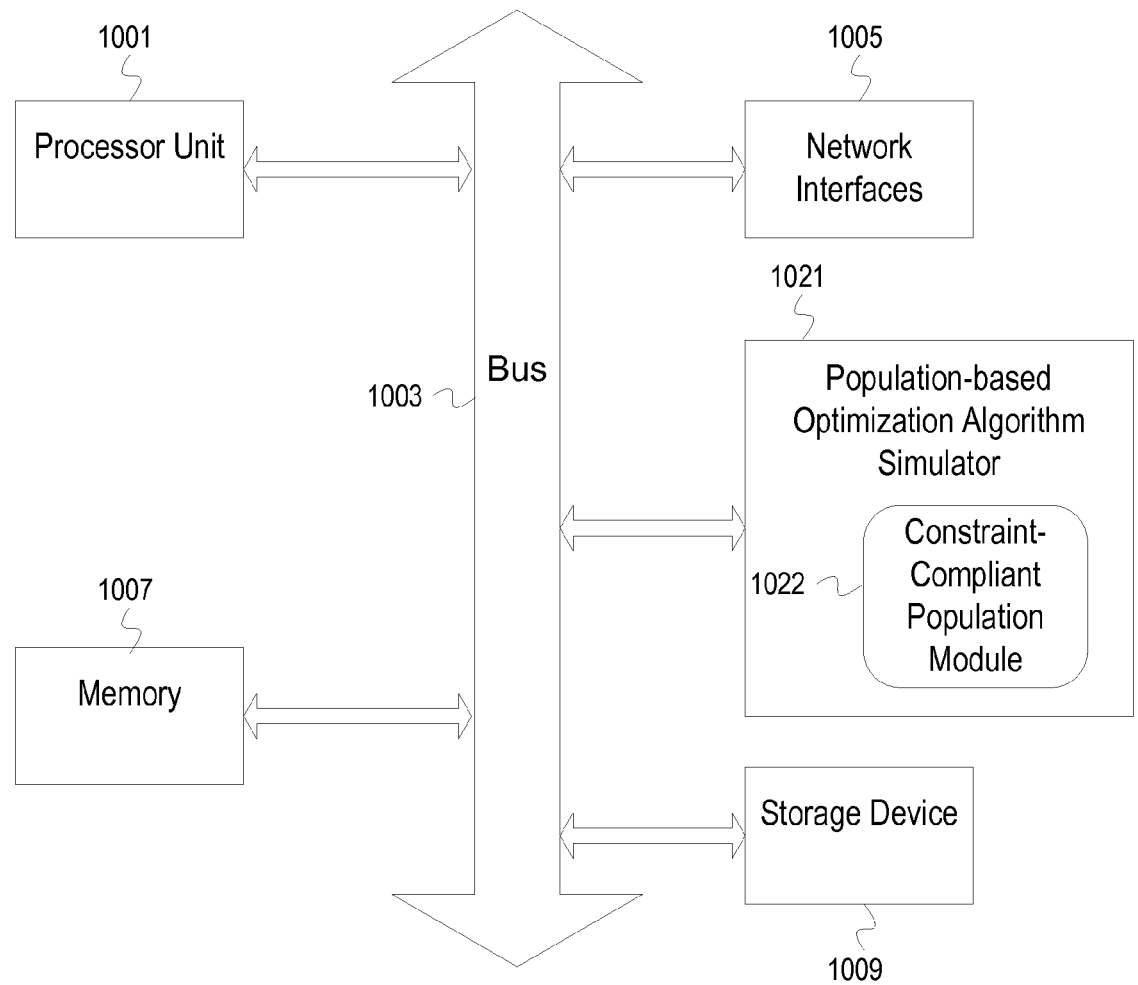
FIG. 10 depicts an example computer system.

FIG. 10 depicts an example computer system. A computer system includes a processor unit 1001 (possibly including multiple processors, multiple cores, multiple nodes, and/or implementing multi-threading, etc.). The computer system includes memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1003 (e.g., PCI bus, ISA, PCI-Express bus, HyperTransport® bus, InfiniBand® bus, NuBus bus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.). The computer system also includes a population-based optimization algorithm simulator 1021. The population-based optimization algorithm simulator 1021 finds solutions to optimization problems in accordance with population-based optimization algorithms. The population-based optimization algorithm simulator 1021 comprises a constraint-compliant population module 1022. The constraint-compliant population module 1022 can determine constrained variables for an optimization problem, generate compliant values for sets of the constrained variables, and generate, using the compliant values, unique and compliant candidate solutions for a population of a generation of candidate solutions for a population-based optimization algorithm simulation. Any one of these functionalities may be partially (or entirely) implemented in hardware and/or on the processing unit 1001. For example, the functionality may be implemented with an application specific integrated circuit, in logic implemented in the processing unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001, the storage device(s) 1009, and the network interface 1005 are coupled to the bus 1003. Although illustrated as being coupled to the bus 1003, the memory 1007 may be coupled to the processor unit 1001.

While the embodiments are described with reference to various implementations and exploitations, it will be understood that these embodiments are illustrative and that the scope of the inventive subject matter is not limited to them. In general, techniques for optimizing seeding of population-based optimization algorithm simulations as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

determining variables of an optimization problem, wherein a first set of the variables comprises one or more constrained variables constrained by one or more constraint conditions for the optimization problem, and wherein a second set of the variables comprises one or more non-constrained variables that are not constrained by the one or more constraint conditions;

determining a plurality of constraint compliant values, for the one or more constrained variables, that comply with the one or more constraint conditions;

generating a plurality of non-constrained values for the one or more non-constrained variables;

prior to running a computer based simulation that implements a population-based optimization algorithm, randomly combining ones of the plurality of constraint compliant values with ones of the plurality of non-constrained values into a plurality of candidate solutions, wherein each of the plurality of candidate solutions includes at least one of the plurality of constraint compliant values to satisfy the one or more constraint conditions for the optimization problem; and running the computer based simulation with the plurality of candidate solutions input as a population for the computer-based simulation.

2. The method of claim 1, wherein said determining the plurality of constraint compliant values, for the one or more constrained variables comprises:
  generating random numbers;
  evaluating the random numbers against the one or more constraint conditions;
  selecting at least a portion of the random numbers that comply with the one or more constraint conditions based on the evaluating the random numbers against the one or more constraint conditions; and
  storing the at least a portion of the random numbers as the plurality of constraint compliant values.

3. The method of claim 1, wherein said randomly combining the ones of the plurality of constraint compliant values with the ones of the plurality of non-constrained values into the plurality of candidate solutions comprises:
  for each of the plurality of candidate solutions,
    randomly selecting the at least one of the plurality of constraint compliant values,
    inserting the at least one of the plurality of constraint compliant values into one or more first positions in a data string, wherein the one or more first positions correspond to the one or more constrained variables,
    inserting at least one of the plurality of non-constrained values into one or more second positions of the data string, wherein the one or more second positions correspond to the one or more non-constrained variables, and
    including the data string in the population.

4. The method of claim 1, wherein said generating the plurality of non-constrained values for the one or more non-constrained variables comprises:
  generating random numbers; and
  associating the random numbers with the one or more non-constrained variables.

5. The method of claim 1, wherein said determining the variables of the optimization problem comprises:
  determining that the one or more constraint conditions affect the one or more constrained variables; and
  determining that the one or more non-constrained variables are free of the one or more constraint conditions.

6. A computer program product for generating a population of a generation of a population-based optimization algorithm computer simulation, the computer program product comprising:
  a non-transitory computer readable storage medium having computer readable program code embodied therewith, the computer readable program configured to,
  select first variables from an optimization problem, wherein at least one condition constrains the first variables within the optimization problem, wherein the first variables and second variables constitute all variable inputs for the optimization problem, and wherein the second variables are not constrained by the at least one condition within the optimization problem,
  generate a data set for the first variables, wherein the data set includes only groups of compliant data values that comply with the at least one condition,
  for each of a plurality of candidate solutions of the population, prior to execution of the population-based optimization algorithm computer simulation,
  randomly select one of the groups of compliant data values from the data set,
  include the one of the groups of compliant data values into a data string, wherein the data string represents the each of the plurality of candidate solutions to the optimization problem,
  determine that the data string is unique from additional data strings within the population, and
  insert the data string into the population.

7. The computer program product of claim 6, wherein the computer readable program code being configured to select the first variables being configured to
  analyze one or more of mathematical and logical descriptions of the at least one condition,
  determine, based on analysis of the one or more of mathematical and logical descriptions of the at least one condition, that the first variables are related to each other, and
  select the first variables based on determination that the first variables are related to each other.

8. The computer program product of claim 7, wherein the computer readable program code being configured to generate the data set for the first variables being configured to
  randomly generate number values for each of the first variables,
  evaluate the number values in an expression of the at least one condition,
  select a subset of the number values that cause the expression to evaluate true, and
  insert the number values into the data set as one of the groups of compliant data values.

9. The computer program product of claim 8, wherein the computer readable program code being configured to include the one of the groups of compliant data values from the data set into the data string being further configured to,
  randomly select the one of the groups of compliant data values from the data set, wherein the one of the groups of compliant data values includes the number values for each of the first variables,
  assign the number values of the one of the groups of the compliant data values to first positions in the data string that correspond to the first variables,
  randomly generate additional number values, and
  assign the additional number values to second positions in the data string that correspond to the second variables.

10. The computer program product of claim 9, wherein the computer readable program code to determine that the data string is unique from additional data strings within the population, is configured to
  determine that the number values in the first positions have not been previously included in additional data strings of the population at additional positions in the additional data strings that correspond to the first variables.

11. The computer program product of claim 6, wherein the computer readable program code being further configured to evaluate one or more of functions, code-blocks, expressions, loops, and branches that describe the at least one condition.

12. The computer program product of claim 6, wherein the computer readable program code being further configured to
  receive first input that defines the first variables and the second variables;
  receive second input that defines the at least one condition that mutually constrains the first variables.

13. A computer program product for generating a population of an initial generation of an evolutionary algorithm based computer simulation, the computer program product comprising:
  a non-transitory computer readable storage medium having computer readable program code embodied therewith, the computer readable program code configured to,
  determine variables of an optimization problem, wherein the variables comprise one or more first variables constrained by one or more constraint conditions for the optimization problem and wherein the variables comprise one or more second variables that are not constrained by the one or more constraint conditions;

determine first values for the one or more first variables that comply with the one or more constraint conditions;

generate second values for the one or more second variables;

prior to execution of a computer based simulation that implements a population-based optimization algorithm, randomly combine ones of the first values with ones of the second values into a plurality of candidate solutions, wherein each of the plurality of candidate solutions includes at least one of the first values to satisfy the one or more constraint conditions for the optimization problem;

include the plurality of candidate solutions in the population; and run the computer based simulation with the plurality of candidate solutions input as the population.

14. The computer program product of claim 13, wherein the computer readable program code being configured to determine the first values for the one or more first variables being configured to generate random numbers;

evaluate the random numbers against the one or more constraint conditions;

select at least a portion of the random numbers that comply with the one or more constraint conditions based on evaluation of the random numbers against the one or more constraint conditions; and store the at least a portion of the random numbers as the first values.

15. The computer program product of claim 13, wherein the computer readable program code being configured to randomly combine the ones of the first values with the ones of the second values into the plurality of candidate solutions being configured to randomly select one or more of the first values, wherein a number of the one or more of the first values is equivalent to a number of the one or more first variables;

insert the one or more of the first values into one or more first positions in a data string, wherein the one or more first positions correspond to the one or more first variables;

insert one or more of the second values into one or more second positions of the data string, wherein the one or more second positions correspond to the one or more second variables; and include the data string as one of the plurality of candidate solutions.

16. The computer program product of claim 13, the computer readable program code configured to generate the second values for the one or more second variables being configured to generate random numbers; and associate the random numbers with the one or more second variables.

17. The computer program product of claim 13, wherein the computer readable program code configured to determine the variables of the optimization problem being configured to determine that the one or more constraint conditions affect the one or more first variables; and determine that the one or more second variables are free of the one or more constraint descriptions.

18. The computer program product of claim 13, wherein the computer readable program code is further configured to evaluate one or more of a function, a code-block, an expression, a loop, and a branch that describes the one or more constraint conditions.

19. An apparatus comprising:

a processing unit;

a network interface; and a constraint-compliant population module of a population-based optimization algorithm simulator operable to, via the processing unit, organize constrained variables for an optimization problem into groups, wherein each of the groups includes a subset of the constrained variables, wherein each of the groups includes at least one constraint expression that relates and mutually constrains the subset of the constrained variables within the optimization problem during an evolutionary algorithm based computer simulation, determine, separately for each of the groups, data values for each of the subset of constrained variables contained in the each of the groups, wherein the data values satisfy all variable constraints of the at least one constraint expression for each of the groups, for each one of a plurality of candidate solutions, prior to evaluation of a fitness of a population of an initial generation for an evolutionary-algorithm-based simulation, randomly select one of the data values for each of the subset of constrained variables, include in a data string the one of the data values from the each of the subsets of constrained variables, wherein the data string represents the one of the plurality of candidate solutions for the optimization problem, randomly generate one or more additional data values for non-constrained variables, wherein the constrained variables and the non-constrained variables constitute all variable inputs for the optimization problem, and wherein the non-constrained variables are not constrained by the optimization problem, include the one or more additional data values in the data string, and include the data string in the population as the one of the plurality of candidate solutions.

20. The apparatus of claim 19, wherein the constraint-compliant population module being operable to analyze a description of the optimization problem, and determine, based on analysis of the optimization problem, the at least one constraint expression for each of the groups.

21. The apparatus of claim 19, wherein the constraint-compliant population module being operable to determine that the data string is unique from any additional data strings within the population before including the data string in the population.

22. The apparatus of claim 19, wherein the constraint-compliant population module being operable to determine, separately for each of the groups, the data values for the each of the subset of constrained variables contained in the each of the groups, being operable to select one of the groups, randomly generate the data values, evaluate the at least one constraint expression for the one of the groups using the data values, and determine that the data values comply with the at least one constraint expression for the one of the groups.

23. The apparatus of claim 19, said constraint-compliant population module being operable to contemporaneously generate the one or more additional data values and determine, separately for the each of the groups, the data values.

24. The apparatus of claim 19, said constraint-compliant population module being operable to evaluate one or more of functions, code-blocks, expressions, loops, and branches that describe the at least one constraint expression.

25. The apparatus of claim 19, said constraint-compliant population module being operable to, via the network interface,
  detect first user input that defines the constrained variables and the non-constrained variables, and
  detect second user input that defines the at least one constraint expression that mutually constrains the constrained variables.

* * * * *